Dec. 13, 1938.    T. SHEEHAN ET AL    2,139,979
CULTIVATOR ATTACHMENT
Filed Jan. 25, 1938
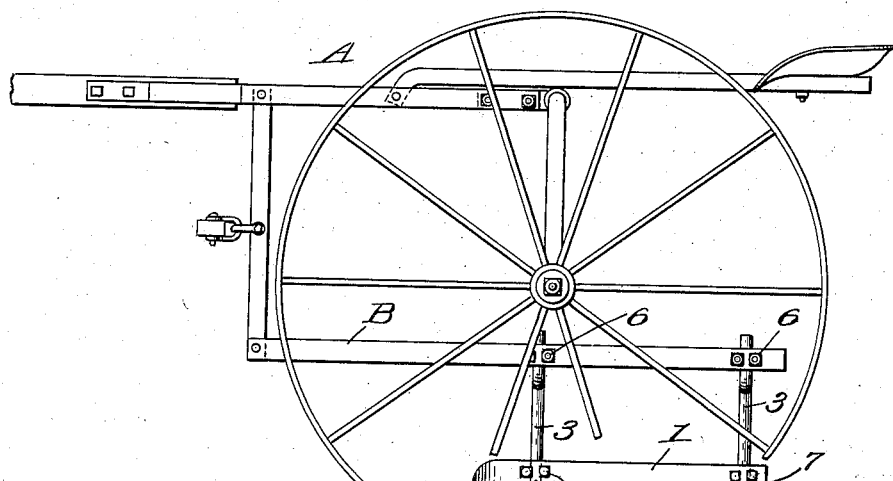
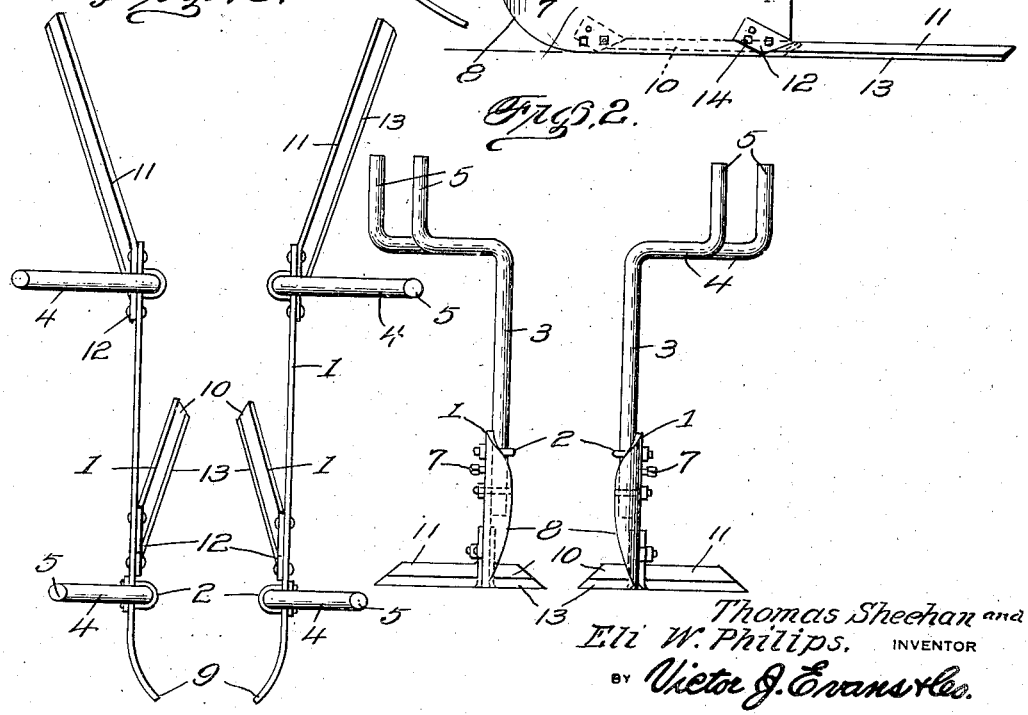
Thomas Sheehan and
Eli W. Philips, INVENTOR
BY Victor J. Evans & Co.
ATTORNEYS Patented Dec. 13, 1938

2,139,979

UNITED STATES PATENT OFFICE 2,139,979

CULTIVATOR ATTACHMENT

Thomas Sheehan and Eli W. Philips, Anadarko, Okla.

Application January 25, 1938, Serial No. 186,873

1 Claim. (Cl. 97—179)

The invention relates to cultivators, and its general object is to provide attachments for wheeled cultivators, for connection with the beams or drag bars thereof, in place of the usual sweeps, shovels and the like and which not only disintegrates the soil, but thoroughly cuts and destroys the growth of weeds, grass and the like, between the rows of and about growing crops, without injury to the latter.

A further object is to provide cutting attachments for cultivators, that can be easily and expeditiously applied and removed, and are readily adjustable for use in a furrow or on a ridge.

Another object is to provide cutting attachments for wheeled cultivators and the like, that are simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation illustrating a cultivator equipped with the cutting attachment which forms the subject matter of the present invention.

Figure 2 is a front view of the attachment per se.

Figure 3 is a top plan view thereof.

Referring to the drawing in detail, the letter A indicates the body frame of a wheeled cultivator and which includes a pair of beams or drag bars B that generally have sweeps, plows, shovels and the like connected thereto in the usual manner, but the attachments which form the subject matter of the present invention are substituted therefor, as clearly shown in Figure 1.

The attachments are of course used in pairs, and the attachment of each pair includes a body plate or runner 1 that is substantially rectangular and in the form as shown is provided with openings arranged in superimposed pairs adjacent the upper longitudinal edge thereof for the purpose of receiving U-bolts 2 that have the lower ends of shanks 3 mounted therein for connecting the plates with respect to the beams B and in vertical parallel relation to each other. The shanks have their upper ends bent at right angle formation as at 4 to provide upstanding portions 5 received in U-bolts 6 mounted on the beams, and cooperating with the U-bolts 2 are set screws 7 that extend through the plates 1 and bear against the shanks, to hold the plates against any possibility of removal or displacement from the shanks, as will be apparent.

The forward ends of the plates are upwardly curved as at 8, from their lower or ground engaging edges, and the forward ends are rounded inwardly toward each other, as at 9, and as clearly shown in Figure 3.

Secured to the confronting faces of the plates 1 adjacent to the forward ends thereof and in close proximity to their lower edges are inner and forward cutting blades 10, while outer or rear cutting blades 11 are secured to the plates 1 on the outer surface thereof, adjacent to their rear ends, as best shown in Figure 3.

The blades 10 and 11 have their attaching end portions 12 bent at an angle with respect to their working portions, and so that the beveled cutting edges 13 thereof will be disposed in substantially the same horizontal plane as the lower edges of the plates, as best shown in Figure 2, and also for disposing the working portions at an inclination throughout the length thereof, as best shown in Figure 1.

The cutting blades are preferably adjustably associated with the plates 1, to vary the angle of the blades with respect to the plates and for that purpose the forward portions 12 thereof have any number of openings therein, for registration with openings in the plates to receive bolt and nut connections 14 that act to secure the cutting blades to the plates, as will be apparent. However, the cutting blades may be permanently fixed to the plates 1 by rivets or like securing means, and in any event the inner blades are disposed in converging relation from their point of connection with the blades 1, while their outer blades are disposed in diverging relation, with the result it will be seen that the inner blades may straddle a row of growing crops while their outer blades will extend between the straddled row and the rows adjacent thereto, therefore foreign growth such as grass, weeds and the like will be cut and destroyed between the rows and adjacent to the growing crops.

While the attachments are primarily designed for cutting and destroying weeds, grass and the like with respect to growing crops, it will be obvious that they also act to disintegrate the soil, as the plates and the cutting blades can be adjusted at any desired depth within the range of the shanks 3.

It is thought from the foregoing description that the advantages and novel features of the invention will be readily apparent.

It is to be understood that changes may be made in the construction and in the combination and arrangement of the several parts, provided that such changes fall within the scope of the appended claim.

What we claim is:

A cultivator attachment comprising substantially rectangular body plates, shanks secured to said plates and rising therefrom, said shanks having right angle bent upper ends to provide vertical upper portions, means for adjustably securing the vertical upper portions to the beams of the cultivator, means for adjustably securing the shanks to the plates, set screws included in the last mentioned means and extending through the plates for engagement with the shanks, said plates being arranged in parallelism with each other and having curved forward ends rounded toward each other, cutting blades arranged in pairs and one pair being adjustably secured to the confronting faces of the plates adjacent the forward ends thereof and the other pair being secured to the outer faces of the plates at the rear ends thereof, said cutting blades having beveled lower edges, and bent at an angle for arrangement at an inclination with respect to the point of connection of the blades with the plates.

THOMAS SHEEHAN.
ELI W. PHILIPS.